United States Patent [19]

Lowe et al.

[11] Patent Number: 5,680,109

[45] Date of Patent: Oct. 21, 1997

[54] IMPULSE LINE BLOCKAGE DETECTOR SYSTEMS AND METHODS

[75] Inventors: Justin Peter Lowe, Rainhill Merseyside; David W. Clarke, Headington, both of England

[73] Assignee: The Foxboro Company, Foxboro, Mass.

[21] Appl. No.: 669,901

[22] Filed: Jun. 21, 1996

[51] Int. Cl.[6] .................................................. G08B 21/00
[52] U.S. Cl. ........................... 340/608; 340/611; 340/626; 73/4 R; 137/557
[58] Field of Search ..................................... 340/607–608, 340/611, 626; 137/554, 557; 73/3, 4 R; 364/558

[56] References Cited

U.S. PATENT DOCUMENTS

| | | | |
|---|---|---|---|
| 3,832,618 | 8/1974 | Levesque et al. | 318/676 |
| 3,846,774 | 11/1974 | Thorbard et al. | 340/239 |
| 3,990,063 | 11/1976 | Schuman | 340/544 |
| 4,072,934 | 2/1978 | Hiller et al. | 340/243 |
| 4,343,180 | 8/1982 | Herden et al. | 73/115 |
| 4,523,611 | 6/1985 | Drzewiecki | 137/804 |
| 4,559,829 | 12/1985 | Bianchi et al. | 73/708 |
| 4,668,948 | 5/1987 | Merkel | 340/606 |
| 4,754,651 | 7/1988 | Shortidge et al. | 73/861.42 |
| 4,821,769 | 4/1989 | Mills et al. | 137/554 |
| 4,870,392 | 9/1989 | Baltz et al. | 340/608 |
| 4,891,990 | 1/1990 | Khalifa et al. | 73/861.24 |
| 4,909,083 | 3/1990 | Fazeli et al. | 73/706 |
| 4,928,255 | 5/1990 | Brennecke et al. | 364/558 |
| 4,937,558 | 6/1990 | Robinet et al. | 340/606 |
| 4,973,950 | 11/1990 | Tourtillot et al. | 340/608 |
| 5,089,214 | 2/1992 | Graham et al. | 376/250 |
| 5,259,248 | 11/1993 | Ugai et al. | 73/721 |
| 5,319,981 | 6/1994 | Mei et al. | 73/706 |
| 5,437,189 | 8/1995 | Brown et al. | 73/721 |

OTHER PUBLICATIONS

Tinham, B., "Turning Noise into Process Knowledge", C & I, Feb. 1996, pp. 42–43.

Thu, H., Takaona, D., Higham, E. H., Echendu, J. E., "Identification of the Transfer Characteristic of a Differential Pressure Transmitter Using Non–Parametric Methods", Control, Mar. 1994, pp. 681–686.

Amadi–Echendu, J.E., Zhu, H. & Atherton, D.P., "Development of Intelligent Flowmeters Through Signal Processing", IFAC/ICICA, Spain, 1992, pp. 281–286.

Amadi–Echendu, J.E. & Hurren, P.J., "Identification of Process Plant Signatures Using Flow Measurement Signals", IEEE Transactions on Instrumentation and Measurement, Apr. 1990.

Higham, E. H., "Casting a Crystal Ball on the Future of Process Instrumentation and Process INstrumentation and Process Measurements", pp. 1–5 (date unknown).

*Primary Examiner*—Jeffery Hofsass
*Assistant Examiner*—Daniel J. Wu
*Attorney, Agent, or Firm*—Lahive & Cockfield, LLP

[57] ABSTRACT

A differential pressure sensor is attached to a process via a high and a low pressure impulse line. An absolute pressure sensor is also attached to each impulse line. To determine if an impulse line is blocked, a noise signal is acquired from the corresponding absolute pressure sensor. A variance of the noise signal is determined and compared to a threshold. If the variance is less than the threshold, an impulse line blockage is indicated.

25 Claims, 5 Drawing Sheets

IMPULSE LINE BLOCKAGE DETECTOR SYSTEMS AND METHODS

TECHNICAL FIELD

The present invention relates, in general, to line blockage detectors for pressure measuring instruments. In particular, the present invention relates to methods and systems for detecting blockages in the impulse lines of pressure sensors, e.g., differential and absolute pressure sensors.

BACKGROUND OF THE INVENTION

Differential and absolute pressure sensors enjoy a variety of uses and applications. One type of differential pressure sensor configuration includes "impulse lines" that couple the sensor to the process fluid or gas to be measured. The impulse lines are typically small bore lines filled with a fluid. This fluid provides pressure coupling between the sensor and the process.

One common problem with differential pressure sensing is not with the sensors themselves, but with blockages forming in the impulse lines. Some blockages may occur because dirt in the process may settle in these lines causing blockages to form. Typical types of blockages include, for example, solid depositions, wax depositions, hydrate formation, sand plugging, gelling, frozen process fluid plugs, and air or foam pockets. All of these blockages can cause errors in measurement. For example, partial blockages and foaming can cause sluggish response whereas complete blockages will produce a static pressure reading. Failure to accurately detect pressure changes in the process fluid can have serious consequences in a process control system. As used herein, the term "blockage" refers to both partial and full blockages of impulse lines.

There are certain processes where these faults occur more frequently, such as those which use fluids with high freezing points and those in dirty environments (e.g., coal-fired power stations). In critical situations, trace heating is often used to prevent impulse line freezing, but this does not prevent the other faults from occurring (and is subject to heating system failure). Thus, a sensor with the ability to detect when its impulse lines are partially or fully blocked would be invaluable to many control system engineers.

The present invention is directed toward solutions to the above-noted problems.

DISCLOSURE OF THE INVENTION

In a first aspect, the present invention includes a system for detecting a blockage of at least one impulse line of a differential pressure sensor. The system includes an absolute pressure sensor, a processor and a comparator. The absolute pressure sensor is coupled to the impulse line, while the processor is coupled to the absolute pressure sensor to acquire data therefrom. The processor determines a noise value as a function of the data. The comparator is coupled to the processor to receive the noise value and compare it to a noise threshold. A blockage of the impulse line is indicated by the comparator if the comparison fails.

As an enhancement, the noise value may comprise a noise variance and the noise threshold may comprise a variance threshold. The comparison fails if the noise variance is less than the variance threshold.

As a further enhancement, the absolute pressure sensor may comprise a first absolute pressure sensor, while the impulse line may comprises a first impulse line. The system may further include a second absolute pressure sensor coupled to a second impulse line of the differential pressure sensor. In this system, the processor and comparator also function in connection with the second absolute pressure sensor to detect blockages in the second impulse line.

As yet another enhancement to the present invention, the absolute pressure sensor and the differential pressure sensor may be integral with a common sensor chip. The system may combine the signals from the absolute pressure sensor and differential pressure sensor to determine a second absolute pressure signal that corresponds to a second impulse line of the differential pressure sensor. The processor and comparator may detect blockages in the second impulse line using the second absolute pressure signal.

The invention described hereinabove may be implemented in a pressure sensor-transmitter package for inclusion in industrial process control systems. Further, the present invention includes methods corresponding to the systems described herein.

To summarize, the present invention has many advantages and features associated with it. Impulse line blockage detection is facilitated using a variety of sensor combinations. In a differential pressure sensor environment, multiple absolute pressure sensors, or a single-chip differential/absolute pressure sensor facilitate blockage detection on both impulse lines. In an absolute pressure sensor environment, blockage of a single impulse line is provided. Furthermore, the techniques disclosed herein are computationally simple, thereby enabling the use of relatively low-speed, low-power electronics. Accordingly, the present invention advances the art of pressure measurement.

BRIEF DESCRIPTION OF THE DRAWINGS

The subject matter regarded as the present invention is particularly pointed out and distinctly claimed in the concluding portion of the specification. The invention, however, both as to organization and method of practice, together with further objects and advantages thereof, may best be understood by reference to the following detailed description taken in conjunction with the accompanying drawings in which the same and similar reference numbers correspond to the same and similar elements:

DETAILED DESCRIPTION OF A PREFERRED EMBODIMENT

The present invention facilitates the detection of blockages in the impulse lines of a differential pressure sensor using at least one absolute pressure sensor coupled to at least one of the impulse lines. In particular, the noise component of the signal acquired from each absolute pressure sensor is used to detect blockages. Furthermore, the same and similar techniques can also be used to detect a blockage in an impulse line attached to a single absolute pressure sensor. The use of noise signals from absolute pressure sensors is preferred over the use of noise signals from the differential pressure sensor due to the unpredictable common mode cancellation effects that the differential pressure sensor signal is subject to.

Figure 1:
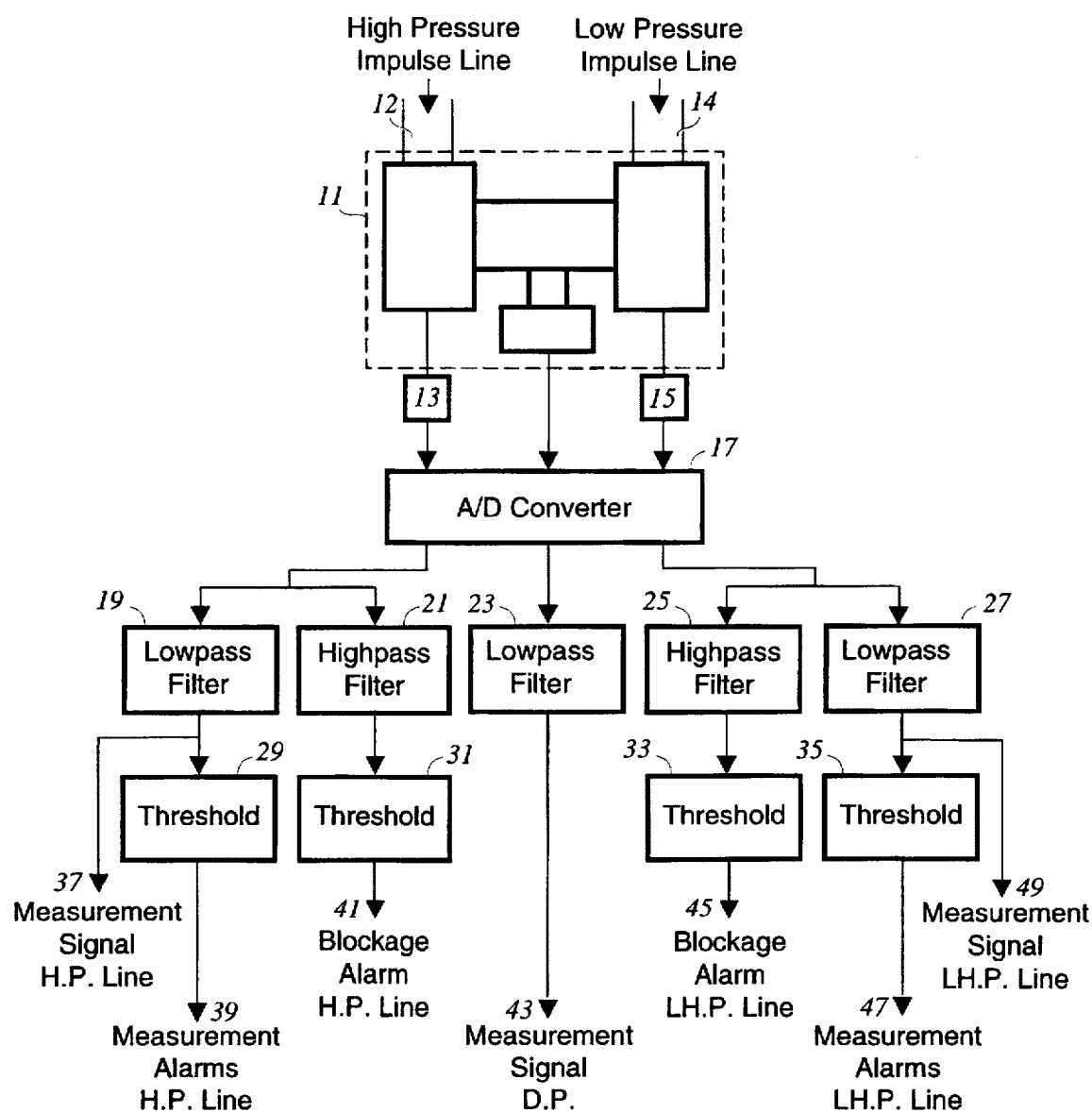
FIG. 1 depicts an impulse line blockage detection system according to an embodiment of the present invention.

Depicted in FIG. 1 is an impulse line blockage detection system pursuant to an embodiment of the present invention. A differential pressure sensor 11 is conventionally attached to a process, and monitors it with a high pressure ("H.P.") impulse line 12 and a low pressure ("L.P.") impulse line 14. Each impulse line also has an absolute pressure sensor coupled thereto. In particular, H.P. impulse line 12 is coupled to an absolute pressure sensor 13, and L.P. impulse line 14 is coupled to an absolute pressure sensor 15. Measurements from the absolute pressure sensors are used in connection with the techniques disclosed herein to identify when the impulse lines have become partially or fully blocked.

A variety of sensor technology can be used to achieve both the differential pressure measurement and the absolute pressure measurements described above. In one example, three separate sensors are used as shown in FIG. 1 (if commercially available sensor/transmitters are used, they may need minor modification to remove a low frequency (<1 Hz) low-pass filter used to restrict the bandwidth of the sensor signal).

In another embodiment, a single sensor chip is used, upon which is mounted a single differential pressure sensor and at least one absolute pressure sensor. The absolute pressure for an impulse line is directly readable from the absolute pressure sensor. The absolute pressure for the other impulse line is determined by arithmetically combining the absolute pressure signal with the differential pressure signal such that the known absolute pressure signal cancels out of the equation (e.g., If the differential pressure signal corresponds to Pressure_A-Pressure_B, and Pressure_A is known, Pressure_A is subtracted from the differential pressure signal to determine Pressure_B; alternatively, if Pressure_B is known, it is added to the differential pressure signal to determine Pressure_A). This derived AP signal is used in connection with the below described techniques as though it had been read from a separate AP sensor. One example of a single-chip differential/absolute pressure sensor can be found in U.S. Pat. No. 5,357,808 entitled "Overpressure-Protected Differential Pressure Sensor", issued Oct. 25, 1994, which is hereby incorporated by reference herein in its entirety.

The signals from the pressure sensors are digitized by one or more analog-to-digital converters ("A/D") 17 and passed to digital filters for further processing. The digital filters separate the measurement and noise components of each of the sensor signals. In particular, data from H.P. absolute pressure sensor 13 is passed through a lowpass filter 19 and a highpass filter 21. Lowpass filter 19 outputs a measurement signal 37 corresponding to the absolute pressure of the H.P. impulse line. Highpass filter 21 outputs a noise signal corresponding to the H.P. impulse line. Similarly, data from L.P. absolute pressure sensor 15 is passed through a lowpass filter 27 and a highpass filter 25. Lowpass filter 27 outputs a measurement signal 49 corresponding to the absolute pressure of the L.P. impulse line. Highpass filter 25 outputs a noise signal corresponding to the L.P. impulse line. Data from differential pressure sensor 11 is passed through a lowpass filter 23 to produce a differential pressure measurement signal The corner frequency and slope of each of the above discussed filters will vary with the process and sensor type. By way of example, in one embodiment, each filter may be a second-order Butterworth type with a corner frequency of 1 Hz.

The outputs of filters 19, 21, 25 and 27 are processed by threshold detectors 29, 31, 33 and 35 to determine alarm conditions. In particular, the output of H.P. lowpass filter 19 is processed by threshold detector 29 to generate H.P. measurement alarms 39; the output of H.P. highpass filter 21 is processed by threshold detector 31 to generate H.P. blockage alarms 41; the output of L.P. highpass filter 25 is processed by threshold detector 33 to generate L.P. blockage alarms 45; and the output of L.P. lowpass filter 27 is processed by threshold detector 35 to generate L.P. measurement alarms 47.

Figure 2:
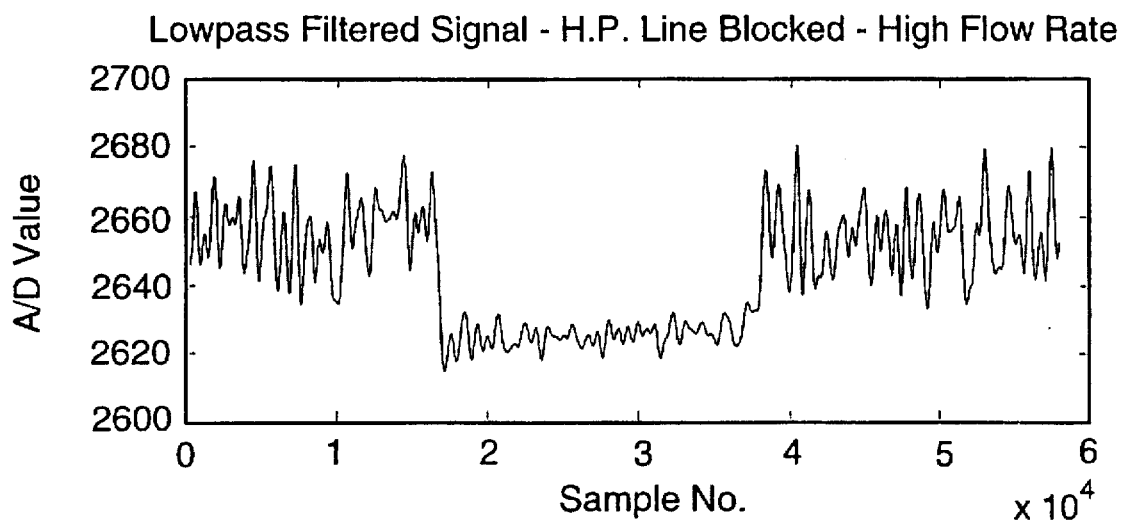
FIGS. 2–5 depict examples of signals acquired using the system of FIG. 1.
Figure 3:
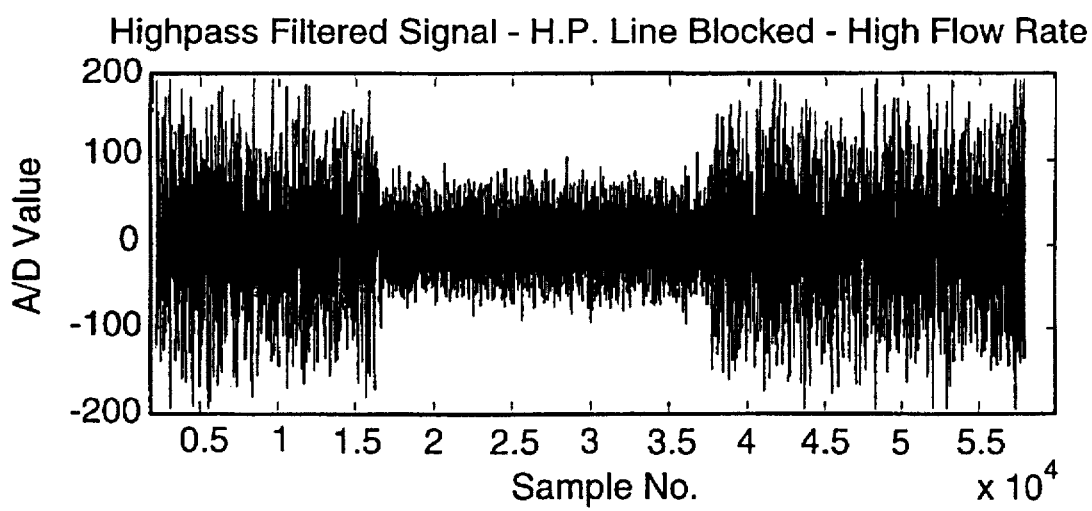
Figure 4:
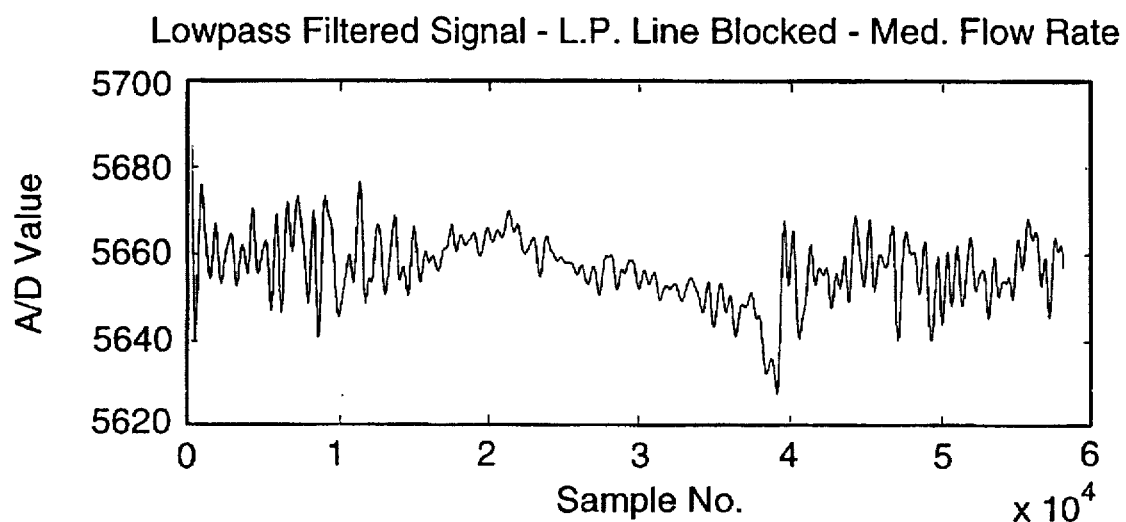
Figure 5:
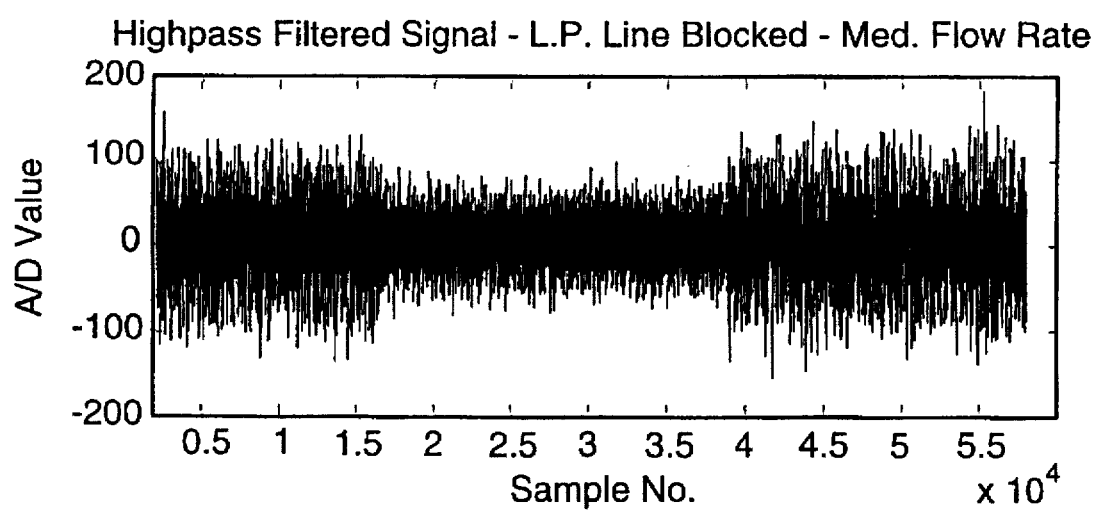

Depicted in FIGS. 2-5 are example graphs showing signals resulting from the operation of the impulse line blockage detection system of FIG. 1. The graphs of FIGS. 2-3 represent the outputs of lowpass filter 19 and highpass filter 21, respectively, during a blockage and clearage of the H.P. impulse line. The period of blockage is indicated in FIG. 2 by the sudden decrease in absolute pressure, and is indicated in FIG. 3 by the sudden decrease in average noise level. The graphs of FIGS. 4-5 represent the outputs of lowpass filter 27 and highpass filter 25, respectively, during a blockage and clearage of the L.P. impulse line. (Note: this data also results from a lower flow rate than the FIG. 2-3 example.) The measurement signal graph of FIG. 4 does not indicate a blockage as clearly as that of FIG. 2. However, the L.P. noise graph of FIG. 5 remains telling. FIG. 5 depicts the L.P. impulse line blockage and clearage by way of a sudden change in average noise level.

Figure 6:
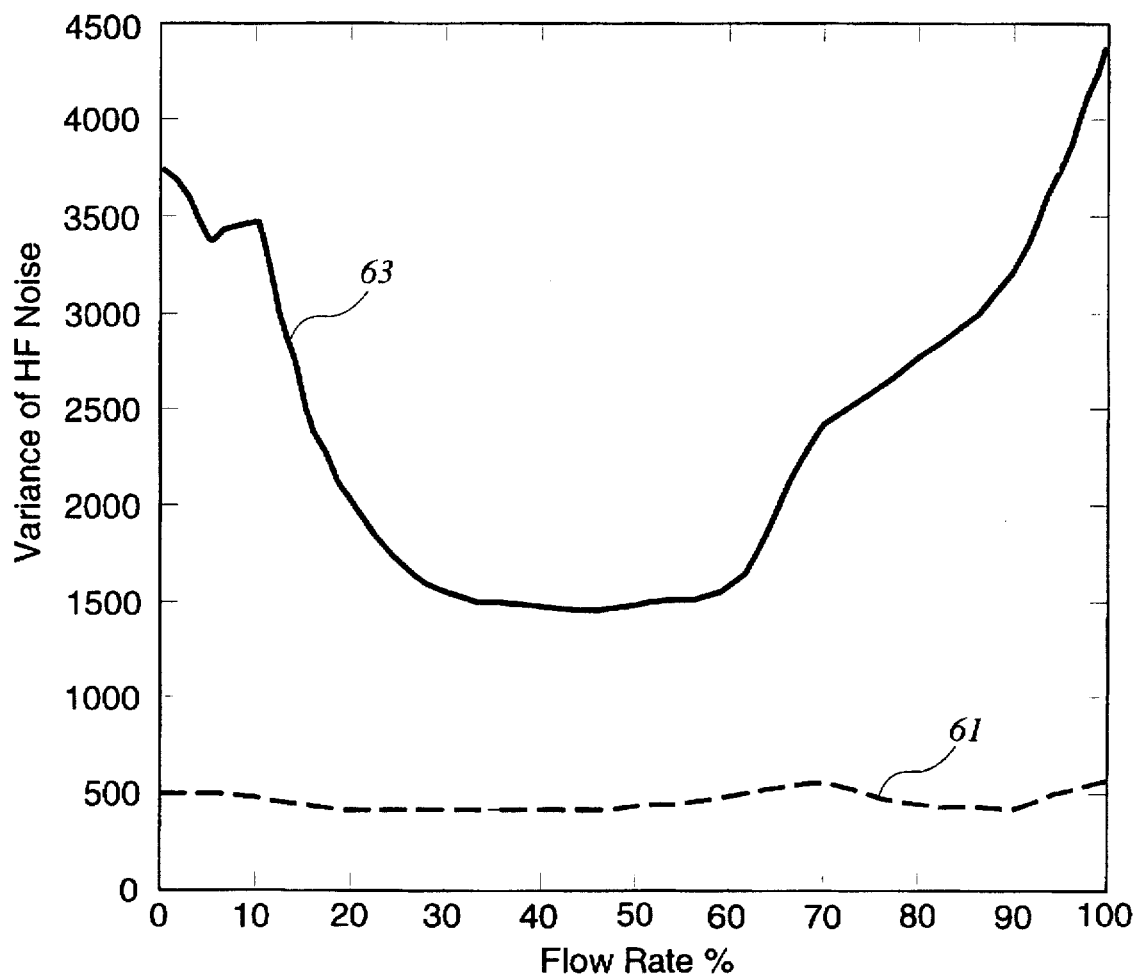
FIG. 6 is a graph of noise variance data corresponding to the system of FIG. 1.

According to the present invention, the noise component of the signal received from the absolute pressure sensors is used to determine when an impulse line blockage has occurred. In one embodiment, the variance of the noise is used to represent the average noise level. Although other representative level values may be used, variance is chosen for its computational simplicity. A sufficient change in variance indicates a blocked impulse line. By way of example, a solid trace 63 of FIG. 6 depicts a graph of noise level variance changes due to blockage as a function of different flow rates (i.e., different valve openings). The graph shows a combination of two noise sources: at low flow rates the noise is mainly from a pump, whereas at higher flow rates the noise is mainly due to turbulence caused by the orifice plate.

In further regard to the graph of FIG. 6, a dashed line 61 indicates an operating condition wherein a blockage in an impulse line has occurred. Regardless of flow rate, the variance is approximately 500 units for the blocked impulse line condition. Further, the minimum variance for non-blockage operation is 1500 units (e.g., solid trace minima). Thus, in this operating example, if a threshold is set for a variance somewhere between 500 and 1500, e.g., 1000, then if an operating variance falls below the threshold, an impulse line blockage is detected. Further, as the variance falls below 1500, and closer to 500, a probabilistic indication of impulse line blockage increases.

Figure 7:
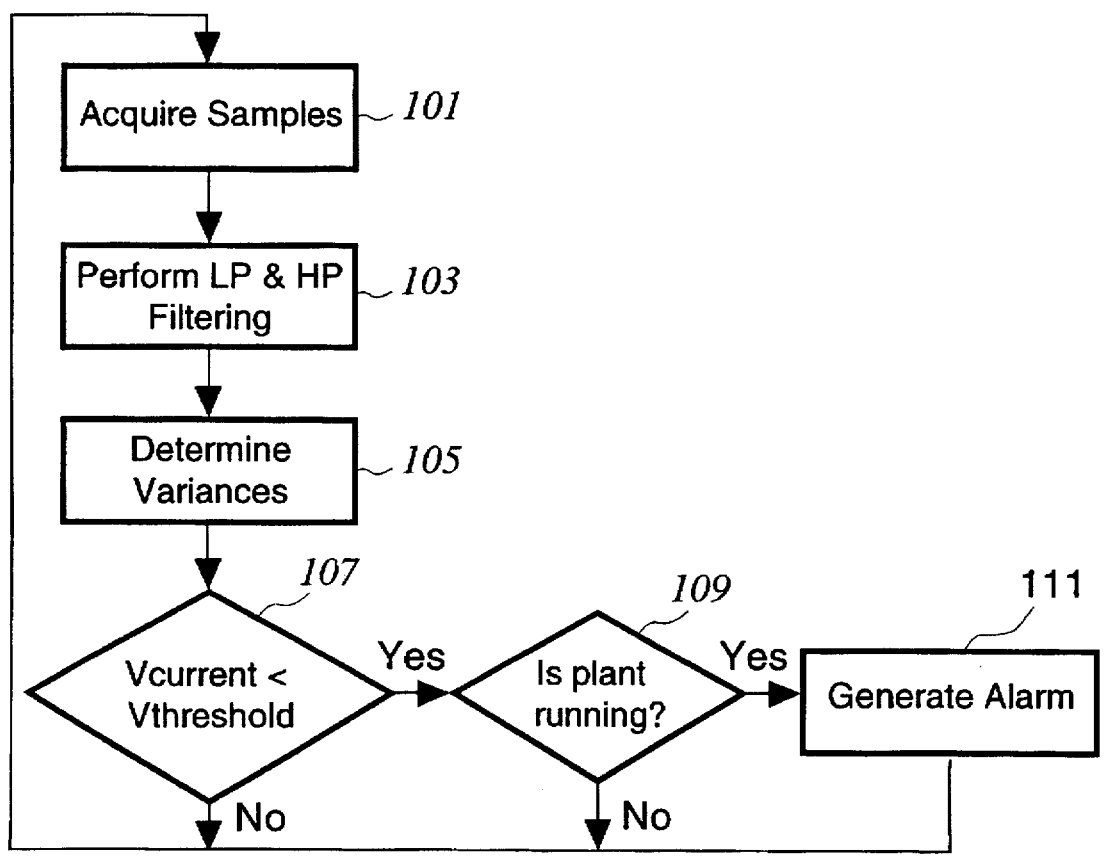
FIG. 7 depicts a flow-diagram of a technique for detecting impulse line blockages pursuant to an embodiment of the present invention.

Pursuant to the present invention, one technique for detecting impulse line blockages (both partial and full) is described below in connection with the flow-diagram of FIG. 7. This technique is described in connection with a configuration of one absolute pressure sensor attached to one impulse line of a differential pressure sensor. However, the technique is duplicated for each impulse line such that blockages therein are detectable. Further, the technique is applicable in a configuration using an AP sensor alone, connected to an impulse line.

To begin, the signal is sampled (STEP 101), and the noise component is separated from the signal component by filtering (STEP 103). The number of samples and sampling rate may vary with the particular implementation. In one embodiment, 1000 samples are taken at a sampling rate of 1 khz. In another embodiment, sampling can be continuous and all calculations performed using a "window" of recent samples, e.g., the last 1000 samples. Other sampling techniques are possible, and will be apparent to one of ordinary skill in the art in view of this disclosure when applied to different process applications. For example, in one application, a group of samples can be taken, and then processed/analyzed using digital filtering/processing. Even a relatively low-speed microprocessor can be used if some delay is tolerable between measurement and blockage analysis (e.g., a few seconds). By using a low-speed microprocessor (rather than, e.g., a fast digital signal processor) substantial power and cost savings are realized.

As a next step, a variance of the current samples is determined, and is designated $V_{CURRENT}$ (STEP 105). $V_{CURRENT}$ is compared to a predetermined threshold, $V_{THRESHOLD}$ (INQUIRY 107). $V_{THRESHOLD}$ is an expected minimum variance for a clean impulse line, and in one embodiment, is empirically determined. If $V_{CURRENT}$ is less than $V_{THRESHOLD}$, a blockage may have occurred, and a further inquiry is performed to determine if the plant is running (INQUIRY 109). If $V_{CURRENT}$ is not less than $V_{THRESHOLD}$, the process iterates (to STEP 101).

If $V_{CURRENT}$ less than $V_{THRESHOLD}$, and the plant is running, then a blockage has occurred and an alarm is generated (STEP 111). If the plant was not running, the process iterates (to STEP 101) based upon the assumption that the decrease in noise level is attributable to a plant shutdown. In one embodiment, information regarding whether the plant is operating may not be available. In such a case, INQUIRY 109 is skipped.

The plant operating information can be determined from, for example, two sources. Firstly, the transmitter (instrument) can request the information from the supervisory control system. In many instances the control system should know if, for example, a pump (e.g., noisy and/or nearby) should be running. Secondly, further signal processing techniques that apply threshold and logic to the noise and measurement signals can be used to check for nearby pump operations by looking for characteristic noise signatures.

Figure 8:
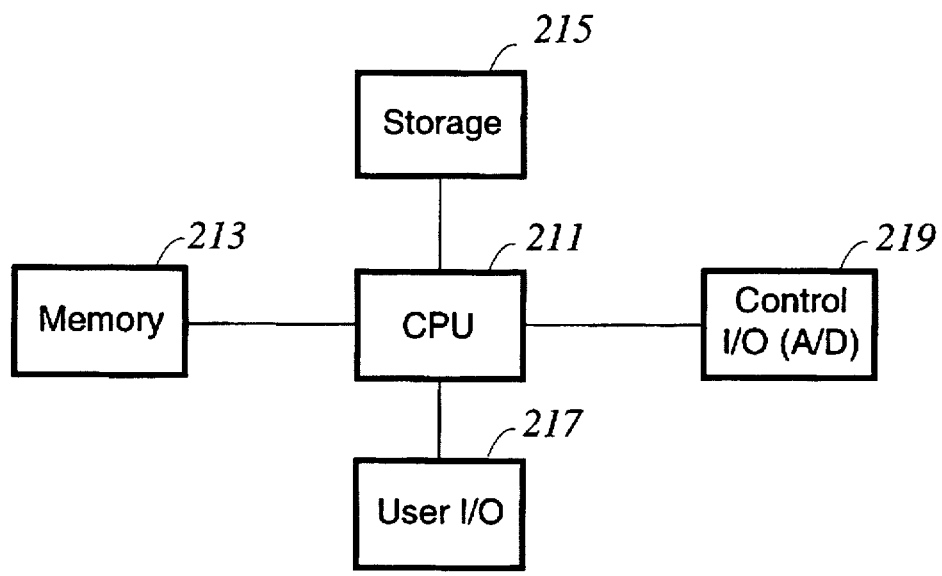
FIG. 8 is a block diagram of a computer system used in implementing the principles of the present invention.

One example of the hardware elements of a computer used to implement the techniques of the present invention are shown in FIG. 8. A central processing unit ("CPU") 211 provides main processing functionality. A memory 213 is coupled to CPU 211 for providing operational storage of programs and data. Memory 213 may comprise, for example, random access memory ("RAM") and/or read only memory ("ROM"). Non-volatile storage of, for example, data files and programs is provided by a storage 215 that may comprise, for example, disk storage or a non-volatile memory. Both memory 213 and storage 215 comprise computer useable medium that may store computer program products in the form of computer readable program code. User input and output are provided by a user input/output ("I/O") facility 217. User I/O facility 217 may include, for example, a LCD display, a graphical display, a mouse and/or a graphics tablet. Control I/O is provided by control I/O facility 219 (including, e.g., A/D converters to interface to sensors).

In one embodiment, the circuitry described herein could all be implemented within a multi-sensor pressure sensor-transmitter such that compact and robust packaging is achieved. In this embodiment, user I/O facility 217 may comprise, e.g., a LCD display and push-button entry, while control I/O may comprise, e.g., A/D converter(s) and interface circuitry to sensor devices and an I/O link to a supervisory control system.

Although the processing described above is all performed in the digital domain, other implementations are possible such that certain design goals may be achieved. For example, the filtering could be performed using active and/or passive filters to save power and circuit complexity. Moreover, simple microprocessors could then be used for subsequent signal processing rather than digital signal processors.

The present invention has many advantages and features associated with it. Impulse line blockage detection is facilitated using a variety of sensor combinations. In a differential pressure sensor environment, multiple absolute pressure sensors, or a single-chip differential/absolute pressure sensor facilitate blockage detection on both impulse lines. In an absolute pressure sensor environment, blockage of a single impulse line is provided. Furthermore, the techniques disclosed herein are computationally simple, thereby enabling the use of relatively low-speed, low-power electronics. Accordingly, the present invention advances the art of pressure measurement.

Described above are examples of techniques for detecting impulse line blockages. It will be apparent to those of ordinary skill in the art that the above-described flows and sequences of steps are only examples. There can be many variations to the above, including, for instance, processing more or less than the steps described above, modifying one or more of the steps, or changing the order of some steps without departing from the true spirit and scope of the present invention. These variations are, therefore, considered a part of the claimed invention.

While the invention has been described in detail herein, in accordance with certain preferred embodiments thereof, many modifications and changes thereto may be affected by those skilled in the art. Accordingly, it is intended by the appended claims to cover all such modifications and changes as fall within the true spirit and scope of the invention.

We claim:

1. A system for detecting a blockage of at least one impulse line of a differential pressure sensor, said system comprising:

an absolute pressure sensor coupled to said at least one impulse line;

a processor coupled to said absolute pressure sensor to acquire data therefrom, said processor determining a noise value as a function of said data; and a comparator coupled to said processor to receive said noise value and compare it to a noise threshold, said comparator indicating said blockage of said at least one impulse line if said comparison fails.

2. The system of claim 1, wherein said noise value comprises a noise variance, said noise threshold comprises a variance threshold, and wherein said comparison fails if said noise variance is less than said variance threshold.

3. The system of claim 1, wherein said absolute pressure sensor comprises a first absolute pressure sensor, and said at least one impulse line comprises a first impulse line, and wherein said system further includes a second absolute pressure sensor coupled to a second impulse line of said differential pressure sensor, said processor and comparator functioning in connection with said second absolute pressure sensor to detect a blockage in said second impulse line.

4. The system of claim 1, wherein said absolute pressure sensor and said differential pressure sensor are integral with a common sensor chip.

5. The system of claim 4, wherein said absolute pressure sensor comprises a first absolute pressure sensor, said data therefrom comprises a first absolute pressure signal, and said impulse line comprises a first impulse line, said system further comprising means for combining signals from said first absolute pressure sensor and said differential pressure sensor to determine a second absolute pressure signal corresponding to a second impulse line of said at least one impulse line.

6. The system of claim 5, wherein said comparator and processor function in combination with said second absolute pressure signal to detect blockages in said second impulse line.

7. The system of claim 1, wherein said comparator is implemented in software of said processor.

8. An impulse line blockage detection system comprising:
- a differential pressure sensor coupled to a high pressure impulse line and a low pressure impulse line;
- a first absolute pressure sensor coupled to said high pressure impulse line;
- a second absolute pressure sensor coupled to said low pressure impulse line;
- a processor coupled to said first absolute pressure sensor and said second absolute pressure sensor to acquire data therefrom, said processor extracting measured noise from said data and determining a noise value for each of said first absolute pressure sensor and said second absolute pressure sensor; and
- a comparator coupled to said processor to receive said noise values and compare them to noise thresholds for each of said first absolute pressure sensor and said second absolute pressure sensor, said comparator indicating a blockage of at least one of said high pressure impulse line and said low pressure impulse line if either comparison fails.

9. The system of claim 8, wherein said noise values comprise noise variances and wherein said noise thresholds comprises variance thresholds.

10. A pressure sensor-transmitter having impulse line blockage detection comprising:
- a differential pressure sensor coupled to a first impulse line and a second impulse line, said differential pressure sensor being integral with a first sensor chip;
- an absolute pressure sensor coupled to said first impulse line, said absolute pressure sensor being integral with said first sensor chip;
- a processor coupled to said absolute pressure sensor and said differential pressure sensor to acquire data therefrom;
- means for combining data from said absolute pressure sensor and said differential pressure sensor to determine absolute pressure data for said second impulse line;
- means for determining a first noise value for said first impulse line from said data from said absolute pressure sensor;
- means for determining a second noise value for said second impulse line from said absolute pressure data for said second impulse line; and
- means for comparing each of said noise values to a noise threshold for each of said first impulse line and said second impulse line, said means for comparing indicating a blockage of at least one of said first impulse line and said second impulse line if either comparison fails.

11. The system of claim 10, wherein each of said noise values comprises a noise variance, and each of said noise thresholds comprises a threshold variance.

12. A system for detecting a blockage of an impulse line of an absolute pressure sensor, said system comprising:
- a processor coupled to said absolute pressure sensor to acquire noise data therefrom, said processor determining a noise value as a function of said data; and
- a comparator coupled to said processor to receive said noise value and compare it to a noise threshold, said comparator indicating said blockage of said impulse line if said comparison fails.

13. The system of claim 12, wherein said noise value comprises a noise variance and said noise threshold comprises a threshold variance.

14. A method for detecting a blockage of at least one impulse line of a differential pressure sensor, one of said at least one impulse line having an absolute pressure sensor coupled thereto, said method comprising:
- acquiring data from said absolute pressure sensor;
- determining a noise value as a function of said data;
- comparing said noise value to a noise threshold; and
- indicating said blockage of said at least one impulse line if said comparison fails.

15. The method of claim 14, wherein said noise value comprises a noise variance, said noise threshold comprises a variance threshold, and wherein said comparison fails if said noise variance is less than said variance threshold.

16. The method of claim 14, wherein said absolute pressure sensor comprises a first absolute pressure sensor, said at least one impulse line comprises a first impulse line, and a second absolute pressure sensor is coupled to a second impulse line of said differential pressure sensor, said method further including: acquiring data from said second absolute pressure sensor; determining a second noise value as a function of said data from said second absolute pressure sensor; comparing said second noise value to a second noise threshold; and indicating said blockage of said second impulse line if said comparison fails.

17. The method of claim 14, wherein said absolute pressure sensor and said differential pressure sensor are integral with a common chip.

18. The method of claim 17, wherein said absolute pressure sensor comprises a first absolute pressure sensor, said data therefrom comprises a first absolute pressure signal, and said impulse line comprises a first impulse line, said method further comprising combining signals from said first absolute pressure sensor and said differential pressure sensor to determine a second absolute pressure signal corresponding to a second impulse line of said at least one impulse line.

19. The method of claim 18, wherein said method further includes: determining a second noise value as a function of said second absolute pressure sensor signal; comparing said second noise value to a second noise threshold; and indicating said blockage of said second impulse line if said comparison fails.

20. A blockage detection method for detecting blockages in at least one of a high pressure impulse line and a low pressure impulse line, each coupled to a differential pressure sensor, said high pressure impulse line being coupled to a first absolute pressure sensor and said low pressure impulse line being coupled to a second absolute pressure sensor, said method comprising:
- acquiring data from said first absolute pressure sensor and said second absolute pressure sensor extracting measured noise from said data and determining a noise value for each of said first absolute pressure sensor and said second absolute pressure sensor;

comparing each noise value to a separate threshold; and indicating a blockage of at least one of said high pressure impulse line and said low pressure impulse line if either comparison fails.

21. The method of claim 20, wherein said noise values comprise noise variances and wherein said noise thresholds comprise variance thresholds.

22. An blockage detection method for a pressure sensor comprising:

acquiring data from said pressure sensor, said pressure sensor include a differential pressure sensor coupled to a first impulse line and a second impulse line, said pressure sensor further including an absolute pressure sensor coupled to said first impulse line, said differential pressure sensor and said absolute pressure sensor being integral with a same chip;

combining data from said absolute pressure sensor and said differential pressure sensor to determine absolute pressure data for said second impulse line;

determining a first noise value for said first impulse line from said data from said absolute pressure sensor;

determining a second noise value for said second impulse line from said absolute pressure data for said second impulse line; and comparing each of said noise values to a separate noise threshold, said comparing indicating a blockage of at least one of said first impulse line and said second impulse line if either comparison fails.

23. The method of claim 22, wherein each of said noise values comprises a noise variance, and each of said noise thresholds comprises a threshold variance.

24. A method for detecting a blockage of an impulse line of an absolute pressure sensor, said method comprising:

acquiring noise data from said absolute pressure sensor;

determining a noise value as a function of said data;

comparing said noise value to a noise threshold; and indicating said blockage of said impulse line if said comparison fails.

25. The method of claim 24, wherein said noise value comprises a noise variance and said noise threshold comprises a threshold variance.

* * * * *